United States Patent
Pai

(10) Patent No.: US 8,299,750 B2
(45) Date of Patent: Oct. 30, 2012

(54) ELECTRONIC DEVICE WITH CHARGING STATION AND MAIN UNIT RECHARGED BY THE CHARGING STATION

(75) Inventor: Hsin-Yi Pai, Sanchong (TW)

(73) Assignee: MSI Computer (Shenzhen) Co., Ltd., Shenzhen, Guangdong Province (CN)

( * ) Notice: Subject to any disclaimer, the term of this patent is extended or adjusted under 35 U.S.C. 154(b) by 332 days.

(21) Appl. No.: 12/778,853

(22) Filed: May 12, 2010

(65) Prior Publication Data
US 2011/0089891 A1  Apr. 21, 2011

(30) Foreign Application Priority Data
Oct. 16, 2009 (TW) ............................... 98219192 U

(51) Int. Cl.
*H01M 10/44* (2006.01)
(52) U.S. Cl. ........................ 320/107; 320/115
(58) Field of Classification Search ................... 320/107
See application file for complete search history.

(56) References Cited

U.S. PATENT DOCUMENTS

| | | | | |
|---|---|---|---|---|
| 4,842,916 A | * | 6/1989 | Ogawa et al. | 428/100 |
| 6,389,329 B1 | * | 5/2002 | Colens | 700/262 |
| 2005/0083011 A1 | * | 4/2005 | Yang et al. | 320/107 |
| 2005/0231156 A1 | * | 10/2005 | Yan | 320/107 |
| 2007/0114975 A1 | | 5/2007 | Cohen et al. | |
| 2007/0216347 A1 | * | 9/2007 | Kaneko et al. | 320/107 |
| 2008/0174268 A1 | * | 7/2008 | Koo et al. | 320/109 |
| 2009/0121673 A1 | * | 5/2009 | Nakayama et al. | 320/107 |
| 2009/0315501 A1 | * | 12/2009 | Li et al. | 318/568.12 |
| 2010/0045234 A1 | * | 2/2010 | Wirth et al. | 320/115 |
| 2010/0085007 A1 | * | 4/2010 | Shu | 320/107 |

FOREIGN PATENT DOCUMENTS

| CN | 2852490 Y | 12/2006 |
|---|---|---|
| TW | 2677230 | 6/2005 |

* cited by examiner

*Primary Examiner* — Arun Williams
(74) *Attorney, Agent, or Firm* — Morris Manning & Martin LLP; Tim Tingkang Xia, Esq.

(57) ABSTRACT

An electronic device includes a charging station and a main unit. The charging station has a first electrode and a second electrode. The first electrode and the second electrode form an angle therebetween, and the main unit has a third electrode and a fourth electrode. When the main unit is connected to the charging station, the main unit firstly contacts the second electrode with the fourth electrode, and then contacts the first electrode with the third electrode, so as to be recharged by the charging station.

14 Claims, 11 Drawing Sheets

ELECTRONIC DEVICE WITH CHARGING STATION AND MAIN UNIT RECHARGED BY THE CHARGING STATION

CROSS-REFERENCE TO RELATED APPLICATIONS

This non-provisional application claims priority under 35 U.S.C. §119(a) on Patent Application No(s). 098219192 filed in Taiwan, R.O.C. on Oct. 16, 2009, the entire contents of which are hereby incorporated by reference.

BACKGROUND OF THE INVENTION

1. Field of Invention

The present invention relates to an electronic device, and more particularly to an electronic device having a charging station.

2. Related Art

With the rapid development of electronic industry, various types of electronic products have been widely applied in people's daily life. For some electronic products, by using a battery module (such as a rechargeable battery) configured therein, these products can be operated without an external power supply, thereby enhancing the convenience of utilizing the electronic products, for example, mobile phones, wireless phones, and intelligent home appliances such as robot cleaners.

Although this type of electronic products can be powered to operate by their own battery modules, due to the limited quantity of electricity of the battery module, upon exhaustion of the electric power of the battery module, the electronic product can be operated again only after the battery module is recharged by a charging station. Thereby, these electronic products are all provided with a charging station for recharging the battery modules.

A robot cleaner and a charging station thereof are taken as an example for illustration below. Generally, the robot cleaner has a control module, a driving module, a wireless signal receiving module, a battery capacity detecting module, and a battery module therein. The control module is electrically connected to the driving module, the wireless signal receiving module, and the battery capacity detecting module, and the battery module is electrically connected to the battery capacity detecting module and the control module. Moreover, a recharging terminal electrically coupled to the battery module is disposed on a lateral surface or bottom surface of the robot cleaner.

The charging station has a charging control module and a wireless signal transmitting module, and a power terminal corresponding to the recharging terminal is disposed on the charging station. The wireless signal transmitting module of the charging station transmits a plurality of wireless signals to ensure a path to the charging station for the robot cleaner. The charging control module controls the specification of the electric power output by the charging station or other electrical characteristics thereof.

In the operation of the robot cleaner, when detecting that the quantity of electricity of the battery module is too low, the battery capacity detecting module of the robot cleaner sends a message to the control module, and the wireless signal receiving module detects a wireless signal transmitted by the wireless signal transmitting module. After the wireless signal receiving module receives the wireless signal, the robot cleaner employs the control module for positioning correction, heads for the charging station by using the driving module, and is connected to the charging station. At this time, the robot cleaner contacts the power terminal of the charging station with the recharging terminal so as to form an electrical conductive state, and thus the robot cleaner is recharged by the charging station.

As for the structural designs, the recharging terminal and the power terminal are both formed of paired positive conducting strips and negative conducting strips, and the conducting strips are configured on the same plane in a manner of alternate arrangement and have a specific size. When the recharging terminal contacts the power terminal, the positive and negative conducting strips of the recharging terminal respectively contact the positive and negative conducting strips of the power terminal, so that the recharging terminal and the power terminal are electrically conducted. In this case, since the positive and negative conducting strips are located on the same plane, when the positive conducting strip of the recharging terminal contacts the positive conducting strip of the power terminal, the negative conducting strip of the recharging terminal also contacts the negative conducting strip of the power terminal at the same time.

At the moment that the positive and negative conducting strips contact at the same time, sparkles may be generated at the contact points quite easily to result in a short circuit, and thus safety concerns are raised against the use of the charging station and the robot cleaner. Moreover, due to the limited sizes of the positive and negative conducting strips, when the robot cleaner to be recharged is connected to the charging station, the robot cleaner and the charging station usually need to be completely aligned in a predetermined direction, so as to make the recharging terminal and the power terminal conducted with each other to perform the recharging operation. The high-precision positioning requirement also increases difficulty in the actual automatic recharging operation.

In addition to the arrangement of the positive and negative conducting strips of the recharging terminal and the power terminal on the same plane, the recharging terminal and the power terminal are respectively exposed on the robot cleaner and the charging station without having a power-off mechanism for preventing touch by mistake. Therefore, if the recharging terminal or the power terminal is damp or contaminated with a liquid, when a user, unaware of this situation, touches the recharging terminal or the power terminal, the user may easily get injured by an electric shock or stroke. Therefore, the configuration of the recharging terminal and the power terminal on the conventional electronic device having a charging station causes safety concerns in use.

SUMMARY OF THE INVENTION

In view of the above, the present invention is an electronic device for improving the conventional electronic device and the recharging terminal and the power terminal of the charging station thereof. Since the positive and negative conducting strips of the recharging terminal and the power terminal contact at the same time in the recharging operation, sparkles may be generated at the moment that the recharging terminal contacts the power terminal, thereby causing safety concerns. Moreover, since the paired positive and negative conducting strips are disposed on the same plane, the user may easily touch the positive and negative conducting strips of the recharging terminal or the power terminal at the same time by mistake, and get injured by an electric shock.

The electronic device of the present invention comprises a charging station and a main unit. The charging station has a first electrode and a second electrode, and the first electrode and the second electrode form an angle therebetween, so that the first electrode and the second electrode are located on different side surfaces of the charging station. The main unit is detachably connected to or separated from the charging station. The main unit has a third electrode corresponding to the first electrode of the charging station and a fourth electrode corresponding to the second electrode of the charging station. When the main unit is connected to the charging station, the main unit first contacts the second electrode with the fourth electrode, and then contacts the first electrode with the third electrode, so that the third electrode and the fourth electrode of the main unit are respectively electrically conducted to the first electrode and the second electrode of the charging station, and the main unit is thus recharged by the charging station.

In the electronic device of the present invention, the first electrode and the second electrode of the charging station are disposed on different planes, so as to minimize the probability for a user to touch the first electrode and the second electrode at the same time by mistake, thereby avoiding the occurrence of accidents like electric shocks or strokes. Further, due to the characteristic that the first electrode and the second electrode of the charging station are disposed on different planes, when the main unit is connected to the charging station, the fourth electrode must contact the second electrode of the charging station first, and then the third electrode contacts the first electrode. Thereby, the third electrode and the fourth electrode are prevented from contacting the first electrode and the second electrode respectively at the same time. In this manner, when the main unit is connected to the charging station, sparkles resulting from instant contact between different electrodes are effectively avoided, so as to greatly enhance the safety of the main unit and the charging station in use.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The electronic device of the present invention, for example, a mobile phone, a wireless phone, or an intelligent home appliance, is provided with a battery module therein and needs to be recharged by a corresponding charging station. A robot cleaner is taken as an example for illustration below, and the present invention is not limited thereto.

Figure 1:
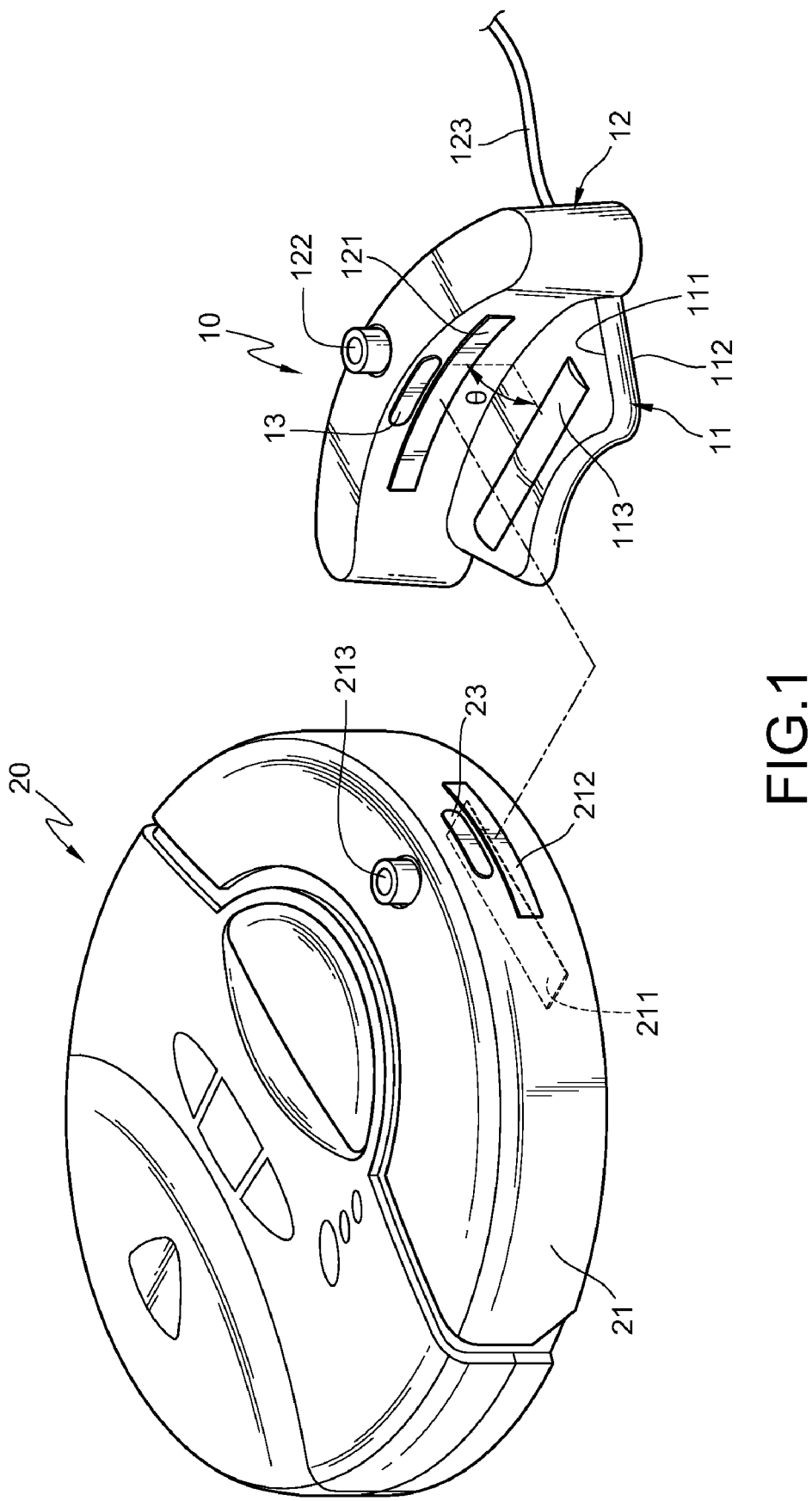
FIG. 1 is a schematic three-dimensional exploded view of a first embodiment of the present invention.
Figure 2:
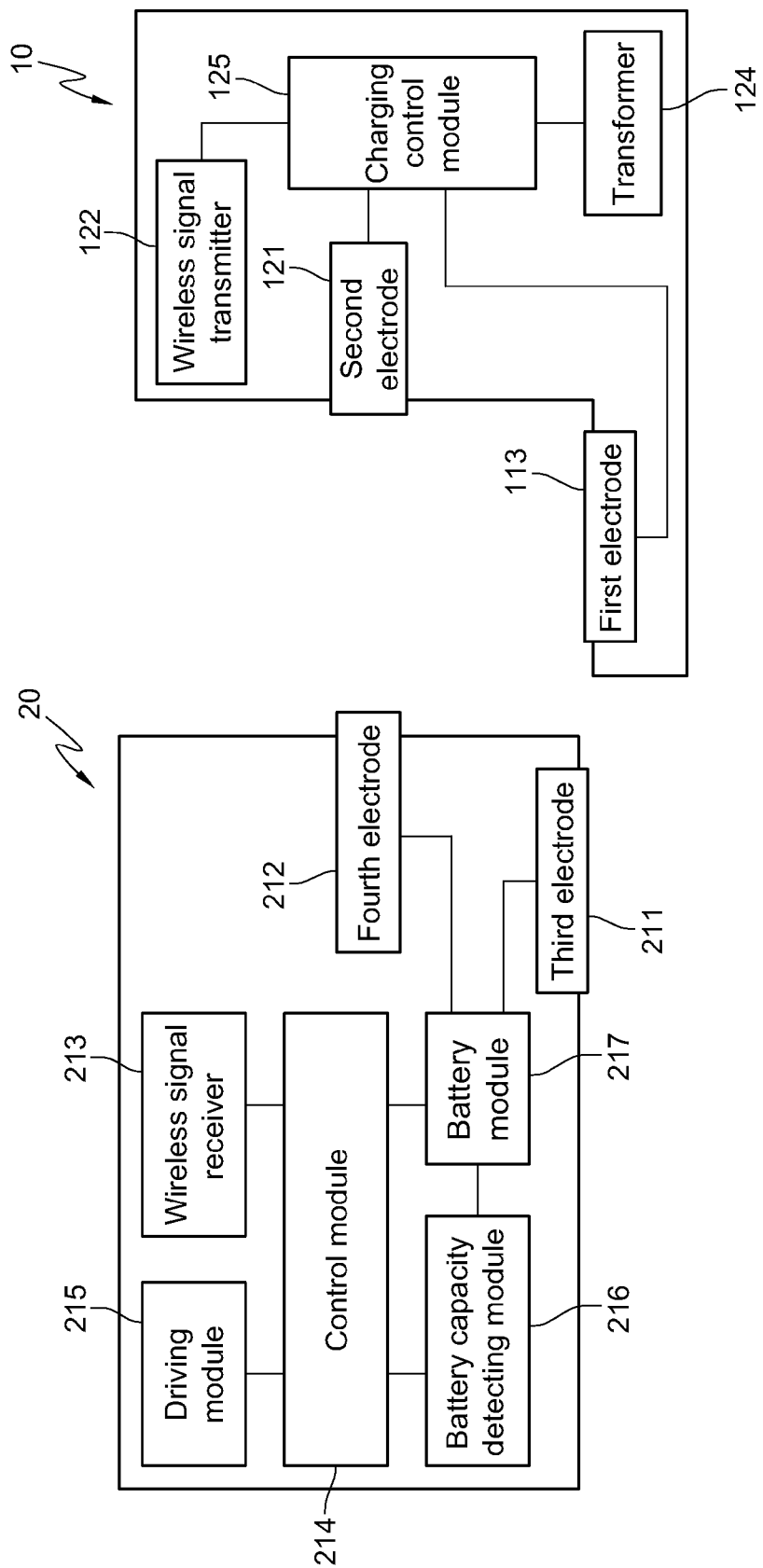
FIG. 2 is a schematic structural view of the first embodiment of the present invention.

Referring to FIGS. 1 and 2, the electronic device in a first embodiment of the present invention comprises a charging station 10 and a main unit 20. The charging station 10 has a carrier 11 and a seat 12. The carrier 11 has a surface 111 and a bottom surface 112 opposite thereto, and the bottom surface 112 of the carrier 11 is placed on a ground surface (not shown). A negative first electrode 113 is disposed on the surface 111 of the carrier 11. The seat 12 stands upright on the surface 111 of the carrier 11, and is spaced from the first electrode 113 by a distance. A positive second electrode 121 and a wireless signal transmitter 122 are disposed on a side surface of the seat 12 adjacent to the first electrode 113, and the wireless signal transmitter 122 is located above the second electrode 121. The first electrode 113 and the second electrode 121 may also be designed into a positive electrode and a negative electrode. In this embodiment, for ease of illustration, the first electrode 113 is a negative electrode and the second electrode 121 is a positive electrode, but the present invention is not limited thereto.

Since the first electrode 113 and the second electrode 121 are respectively located on the surface 111 of the carrier 11 and the side surface of the seat 12, the first electrode 113 and the second electrode 121 form an angle θ therebetween. The wireless signal transmitter 122 may be an infrared, laser, or blue tooth transmitter, for transmitting a wireless signal in a specific range. A power cord 123 is disposed on another side surface of the seat 12, and a transformer 124 and a charging control module 125 are disposed in the seat 12 (as shown in FIG. 2). The first electrode 113, the second electrode 121, the wireless signal transmitter 122, and the transformer 124 are respectively coupled to the charging control module 125, so as to be electrically connected thereto. One end of the power cord 123 is inserted in the seat 12 and connected to the transformer 124 therein, and the other end of the power cord 123 passes through the seat 12 and is conducted to an external socket (not shown), so as to transfer an AC power supply from the socket to the transformer 124. The AC power supply is then converted by the transformer 124 into a DC power supply suitable for the main unit 20. Afterward, the DC power supply is transferred to the first electrode 113 and the second electrode 121 through the charging control module 125.

Figure 3:
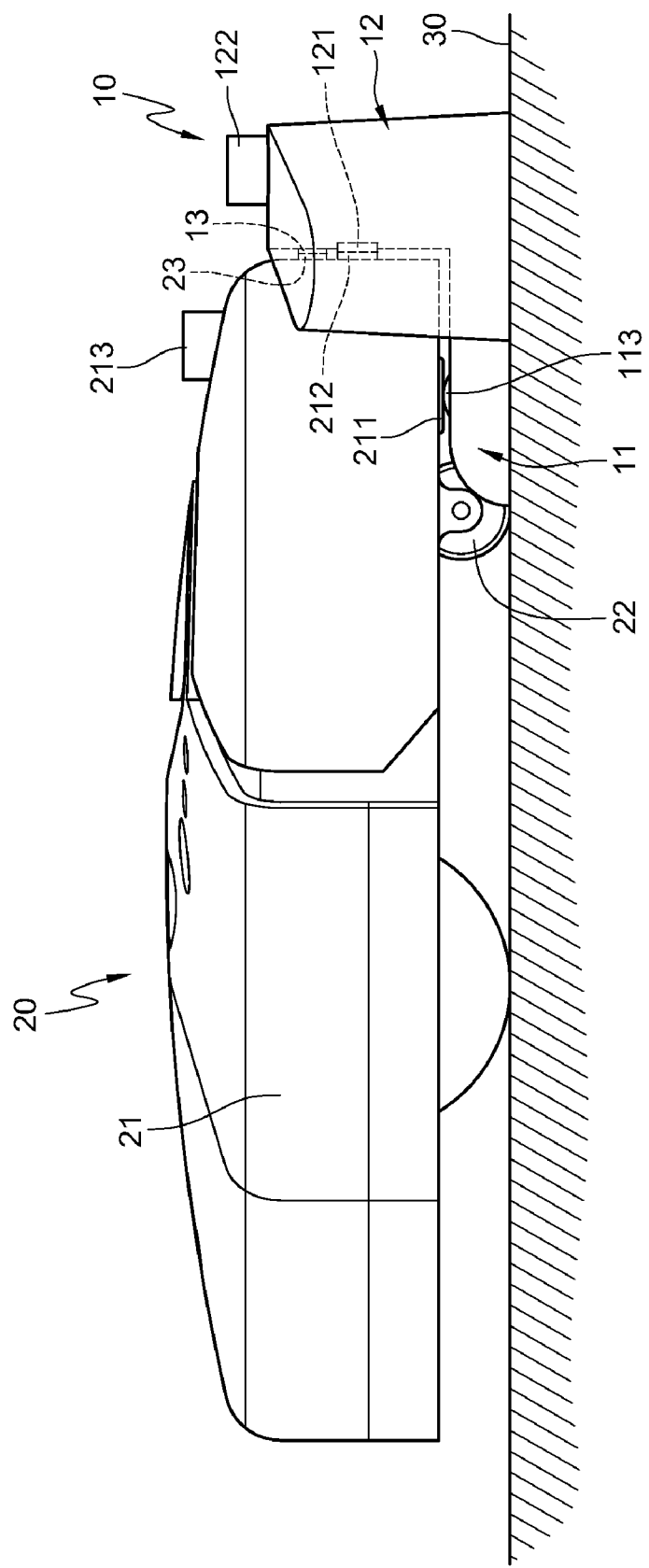
FIG. 3 is a schematic side view of an assembly of the first embodiment of the present invention.

The main unit 20 has a main body 21 and a plurality of rollers 22 (as shown in FIG. 3). The plurality of rollers 22 is disposed on the bottom of the main body 21, and used for driving the main body 21 to move, for example, go forward/backward and rotate leftward/rightward, on a plane such as the ground surface. A negative third electrode 211 and a positive fourth electrode 212 are disposed on two side surfaces of the main body 21 corresponding to the carrier 11 and the seat 12 of the charging station 10. The polarity of the third electrode 211 is the same as that of the first electrode 113, the polarity of the fourth electrode 212 is the same as that of the second electrode 121, and the polarities of the third electrode 211 and the fourth electrode 212 are opposite. That is, when the first electrode 113 is a positive electrode, the third electrode 211 is also a positive electrode, and the second electrode 121 and the fourth electrode 212 are both negative electrodes. The main body 21 has a wireless signal receiver 213 disposed on the same side surface of the main body 21 as the fourth electrode 212, and used for receiving a wireless signal transmitted by the wireless signal transmitter 122 of the charging station 10.

The main body 21 is provided with a control module 214, a driving module 215, a battery capacity detecting module 216, and a battery module 217 therein. The wireless signal receiver 213, the driving module 215, and the battery capacity detecting module 216 are respectively coupled to the control module 214, so as to be electrically connected thereto. The battery module 217 is respectively coupled to the battery capacity detecting module 216, the third electrode 211, and the fourth electrode 212. The battery module 217 is a device capable of storing electric power like a rechargeable battery, for providing the main unit with the electric power required for operation. The driving module 215 is connected to the plurality of rollers 22, and used for driving the rollers 22 to rotate, thereby propelling the main body 21 to go forward/backward and rotate leftward/rightward.

Referring to FIGS. 1 to 5, for the operations between the main unit 20 and the charging station 10, when the main unit 20 is in an operating state (S101), the battery capacity detecting module 216 of the main unit 20 continuously detects the charge capacity of the battery module 217. When the battery capacity detecting module 216 detects that the charge capacity of the battery module 217 is insufficient (S102), for example, only 10% or 15% of the charge capacity is remained, the control module 214 (such as a central processing unit (CPU)) of the main unit 20 sends a signal to actuate the wireless signal receiver 213. The wireless signal receiver 213, after being actuated, searches for the position of the charging station 10 according to the wireless signal (S103). The wireless signal receiver 213 continuously receives the wireless signal transmitted from the wireless signal transmitter 122, and sends data about the wireless signal to the control module 214. The control module 214 performs positioning correction on the directions of the main unit 20 and the charging station 10 according to the received data about the wireless signal, and sends a direction control signal to the driving module 215, so that the driving module 215 controls the rotation direction of the plurality of rollers 22, and the side of the main unit 20 provided with the third electrode 211 and the fourth electrode 212 is guided close to the side of the charging station 10 provided with the first electrode 113 and the second electrode 121 (S104). Since the technology for the main unit to automatically move close to the charging station according to the received wireless signal has been known and is not the key point to be emphasized by the present invention, the detailed structure and operating principle thereof will not be repeated herein again.

Figure 4:
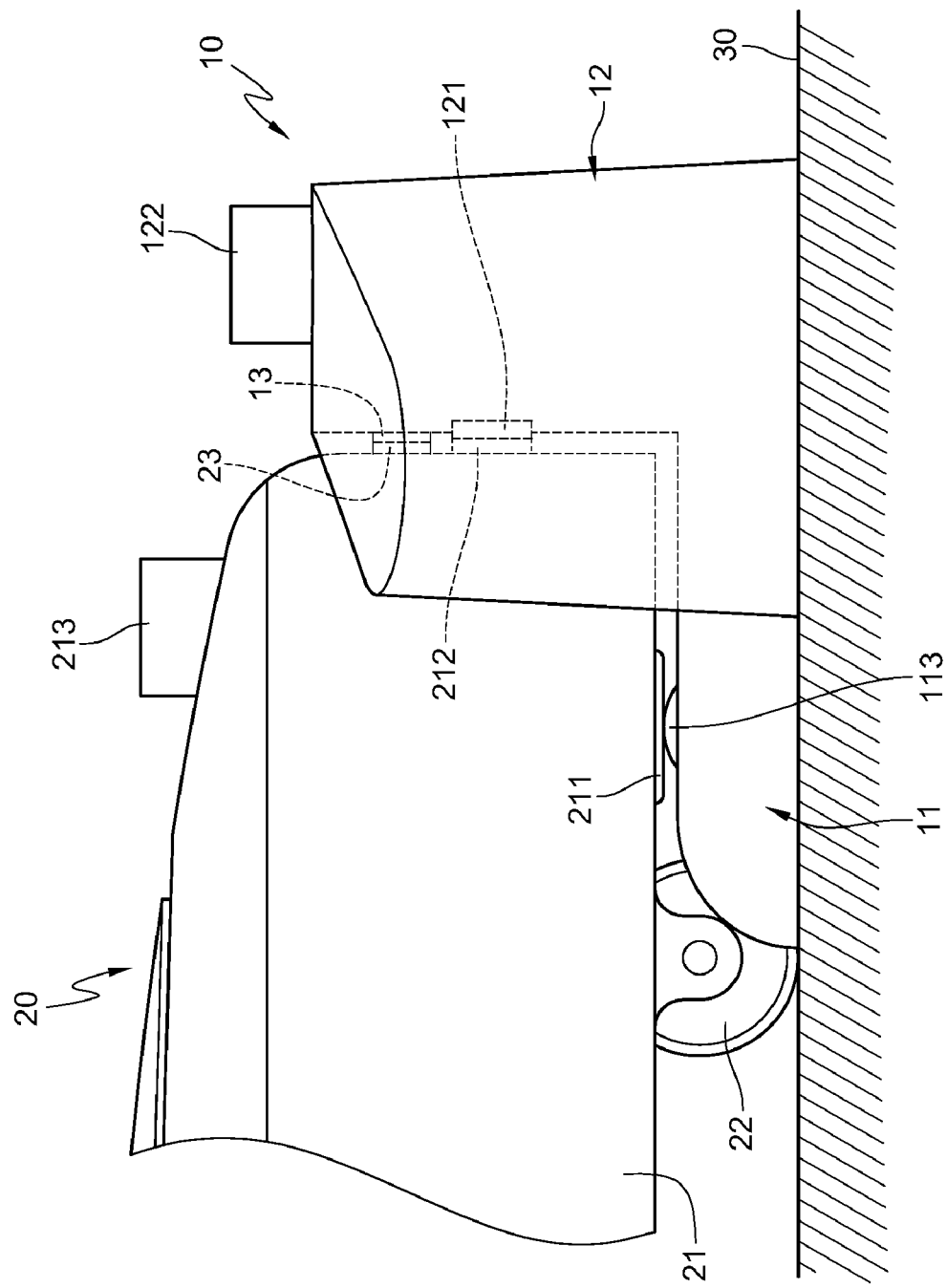
FIG. 4 is a partial enlarged view of FIG. 3.
Figure 5:
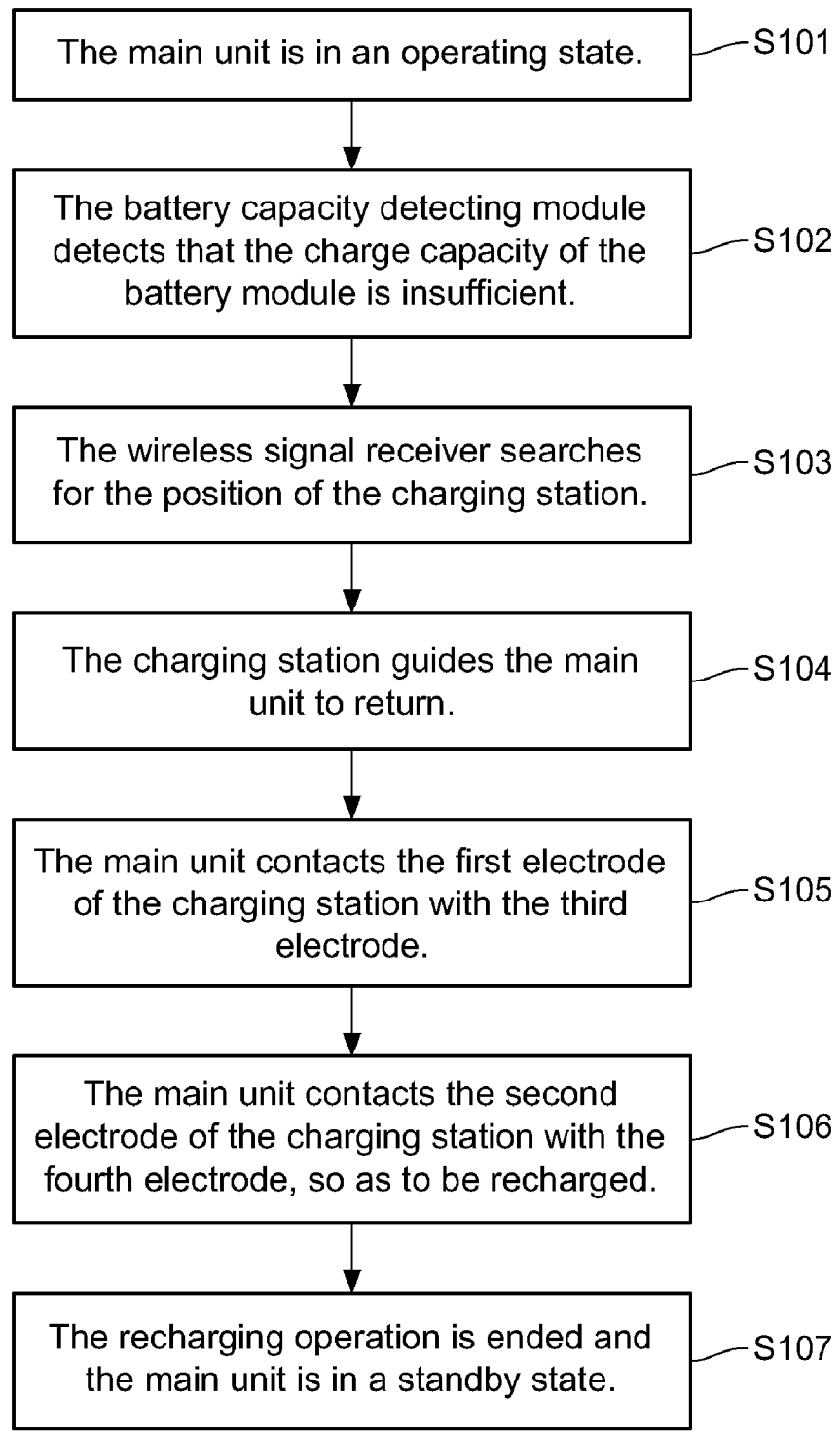
FIG. 5 is a control flow chart of the first embodiment of the present invention.

As the first electrode 113 and the second electrode 121 of the charging station 10 are located on different planes and form an angle θ therebetween, when the side of the main unit 20 provided with the third electrode 211 and the fourth electrode 212 is guided close to the side of the charging station 10 provided with the first electrode 113 and the second electrode 121, the main unit 20 first contacts the first electrode 113 of the charging station 10 with the third electrode 211, i.e., the negative electrodes of the main unit 20 and the charging station 10 are electrically conducted (S105). Afterward, the main unit 20 is continuously drawn close to the charging station 10, and finally the fourth electrode 212 of the main unit 20 contacts the second electrode 121 of the charging station 10, so that the main unit 20 is connected to the charging station 10 (as shown in FIGS. 3 and 4). In this case, the positive electrodes of the main unit 20 and the charging station 10 are also electrically conducted. Thereby, the battery module 217 of the main unit 20 can be recharged by an external power supply through the charging control module 125 of the charging station 10 (S106). The recharging operation is ended when the charge capacity of the battery module 217 is recovered, and the main unit 20 is in a standby state (S107).

In the above process, as the negative electrodes of the main unit 20 and the charging station 10 are electrically conducted first (i.e., the main unit 20 contacts the first electrode 113 with the third electrode 211), and then the positive electrodes of the two are electrically conducted (i.e., the main unit 20 contacts the second electrode 121 with the fourth electrode 212). Therefore, when the main unit 20 is connected to the charging station 10, sparkles resulting from instant contact between the positive and negative electrodes can be avoided. Moreover, as the first electrode 113 and the second electrode 121 are disposed on different planes of the charging station 10, the probability for a user to touch the first electrode 113 and the second electrode 121 at the same time by mistake is lowered, thereby preventing the user from getting injured by an electric shock or stroke.

Although the first electrode 113 and the second electrode 121 of the charging station 10 are disposed on different planes in this embodiment, when the main unit 20 is connected to the charging station 10, the main unit 20 must contact the first electrode 113 with the third electrode 211 first, and then contact the second electrode 121 with the fourth electrode 212. However, in other embodiments of the present invention, the first electrode 113 and the second electrode 121 of the charging station 10 may also be disposed on the same plane. For example, the first electrode 113 and the second electrode 121 are disposed on the surface 111 of the carrier 11 of the charging station 10, and form an angle therebetween, so as to achieve an alternate arrangement.

Specifically, on the surface 111 of the carrier 11, the first electrode 113 is disposed on one end far away from the seat 12, and the second electrode 121 is disposed on one end close to the seat 12. Besides, the third electrode 211 and the fourth electrode 212 on the main unit 20 are correspondingly disposed. In this manner, when the main unit 20 is connected to the charging station 10, the same effect is achieved by enabling the main unit 20 to contact the first electrode with the third electrode 211 and then contact the second electrode 121 with the fourth electrode 212. In this embodiment, that the first electrode 113 and the second electrode 121 of the charging station 10 are disposed on different planes is taken as an example for illustration, and the present invention is not limited thereto.

Further, in order to make the main unit 20 contact the first electrode 113 with the third electrode 211 more precisely during the connection to the charging station 10, according to the characteristic that the first electrode 113 and the second electrode 121 are not disposed on the same plane, the surface areas of the first electrode 113 and the second electrode 121 are appropriately increased, so that it is easier for the third electrode 211 and the fourth electrode 212 of the main unit 20 to respectively contact the first electrode 113 and the second electrode 121 during the positioning of the main unit 20. Alternatively, a magnet 23 is disposed on the side of the main unit 20 provided with the fourth electrode 212, and a metal strip 13 corresponding to the magnet 23 is disposed on the side of the charging station 10 provided with the second electrode 121 (as shown in FIG. 1). When the main unit 20 is close to the charging station 10, the magnetic attraction of the magnet 23 to the metal strip 13 is employed for the guiding and positioning of the fourth electrode 212 of the main unit 20 and the second electrode 121 of the charging station 10 (as shown in FIGS. 3 and 4). Similarly, the magnet 23 may be disposed on the charging station 10 and the metal strip 13 may be disposed on the main unit 20 to achieve the same effect of positioning through the magnet 23 and the metal strip 13 (not shown).

Referring to FIGS. 1, 2, 6, and 7, when the main unit 20 is provided with the magnet 23, a conducting switch 14 is disposed in the seat 12 of the charging station 10 at the same time. The conducting switch 14 is connected between the charging control module 125 and the second electrode 121, so that the second electrode 121 needs to be electrically connected to the charging control module 125 through the conducting switch 14. The conducting switch 14 has a metallic reed 141 and a conducting strip 142. One end of the reed 141 is connected to the second electrode 121, and the other end of the reed 141 is suspended above the conducting strip 142 and corresponding to the position of the magnet 23 on the main unit 20. The conducting strip 142 is disposed on one side in the charging station 10 adjacent to the second electrode 121, and is spaced from the second electrode 121 by a distance. Meanwhile, one end of the conducting strip 142 is coupled to the charging control module 125.

Figure 6:
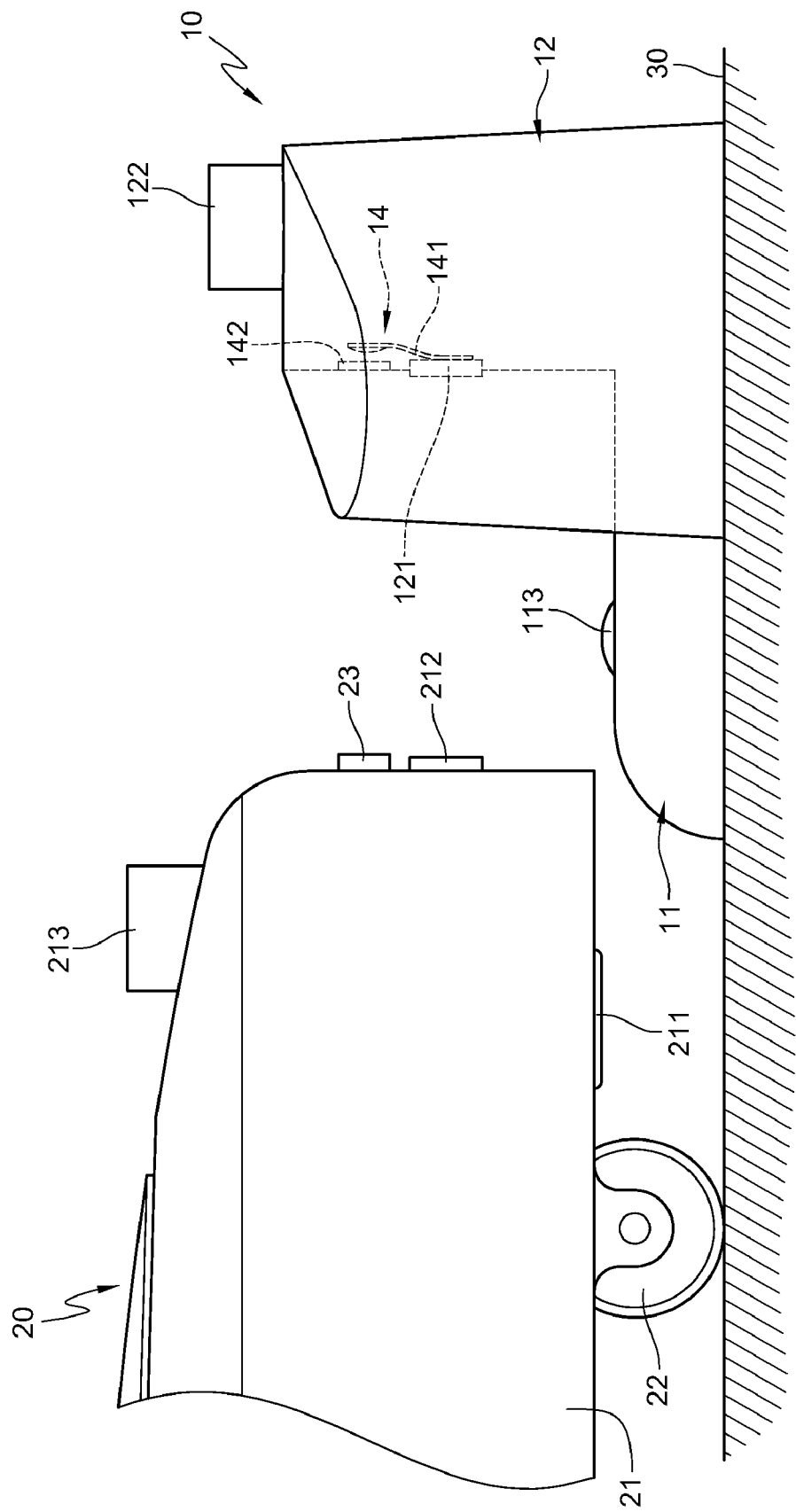
FIG. 6 is a schematic partial cross-sectional view of a charging station having a conducting switch according to the first embodiment of the present invention.
Figure 7:
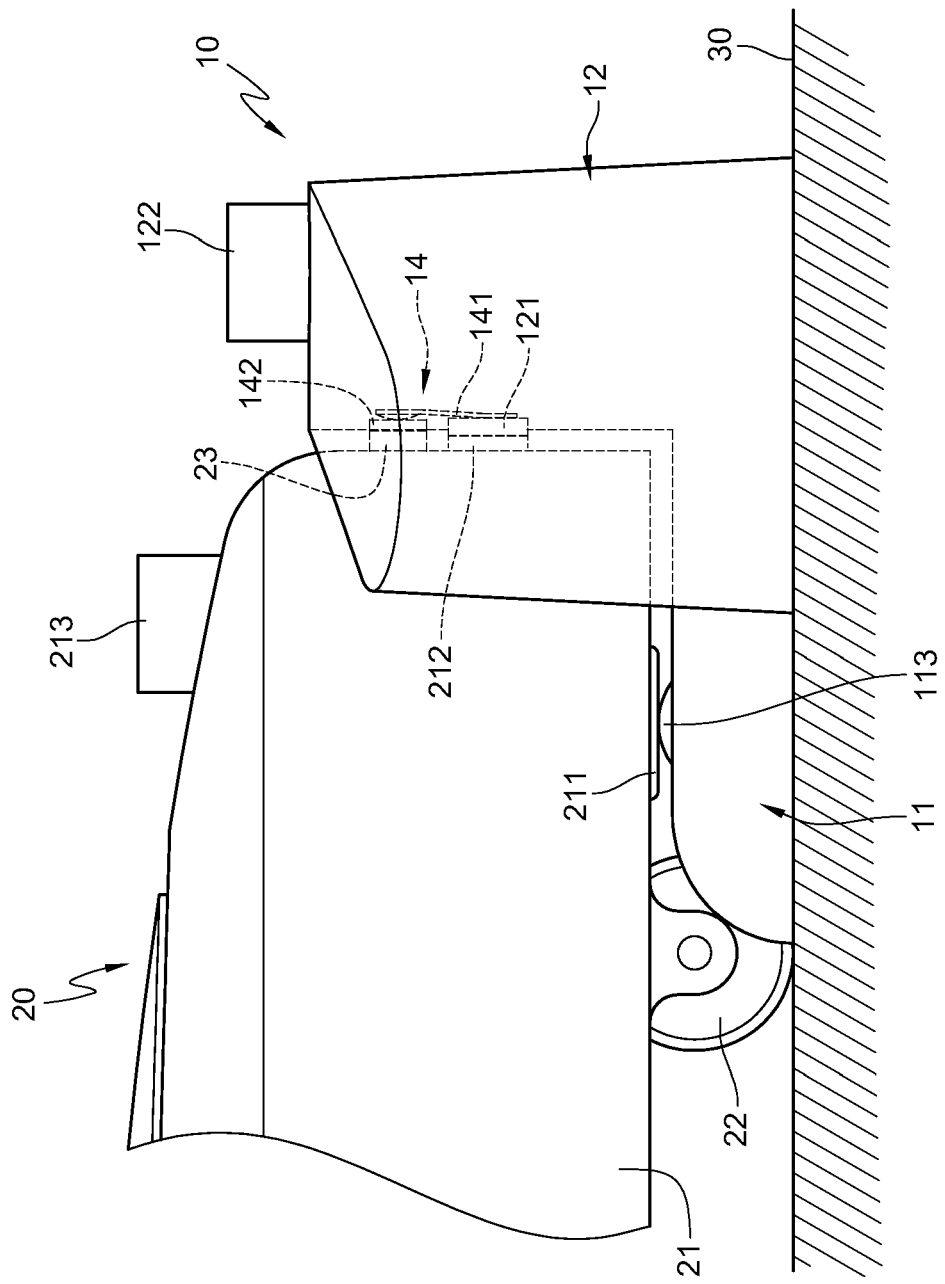
FIG. 7 is a schematic partial view illustrating the operation of the charging station having a conducting switch according to the first embodiment of the present invention.

Before the main unit 20 is connected to the charging station 10, the second electrode 121 and the charging control module 125 of the charging station 10 are disconnected (as shown in FIG. 6). When the main unit 20 contacts the second electrode 121 of the charging station 10 with the fourth electrode 212, as the reed 141 of the conducting switch 14 under the magnetic attraction of the magnet 23 on the main unit 20 is bent to rest on the conducting strip 142, so that the second electrode 121 and the charging control module 125 are electrically connected, thereby achieving electrical conduction between the fourth electrode 212 and the second electrode 121 (as shown in FIG. 7). Therefore, the conducting switch 14 is disposed in a manner similar to the operating principle of a relay to ensure that the circuit is conducted only after the charging station 10 is connected to the main unit 20, thereby further avoiding the occurrence of accidents like electric shocks. It can be understood that, the corresponding disposition relation between the magnet 23 and the conducting switch 14 is also applicable to the first electrode 113, the third electrode 211, and/or the fourth electrode 212, or the conducting switch 14 may be replaced by a relay (not shown) to achieve the same effect of electrically disconnecting the first electrode 113, the third electrode 211, and/or the fourth electrode 212 before the main unit 20 is connected to the charging station 10.

Figure 8:
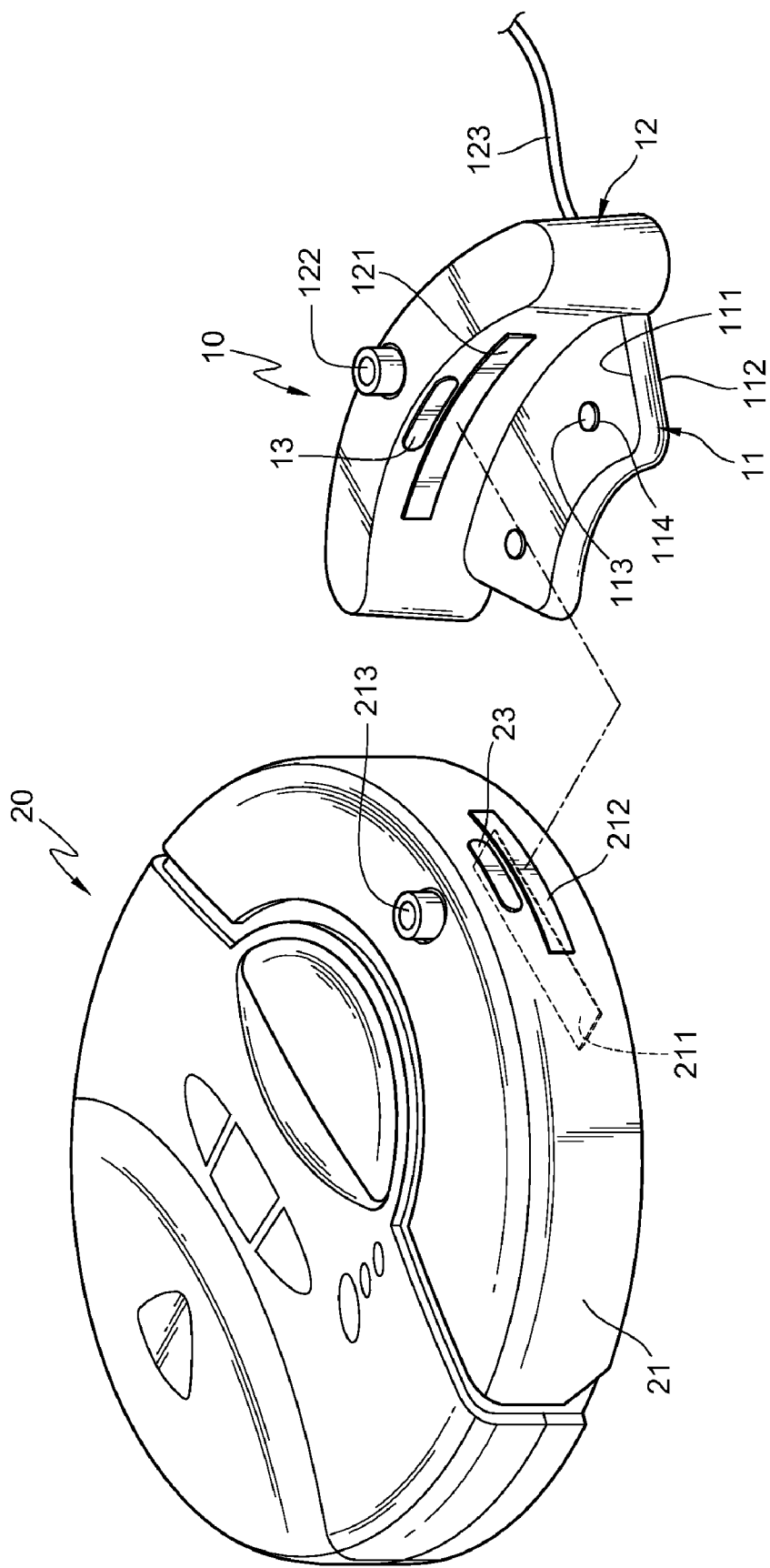
FIG. 8 is a schematic three-dimensional exploded view of a second embodiment of the present invention.
Figure 9:
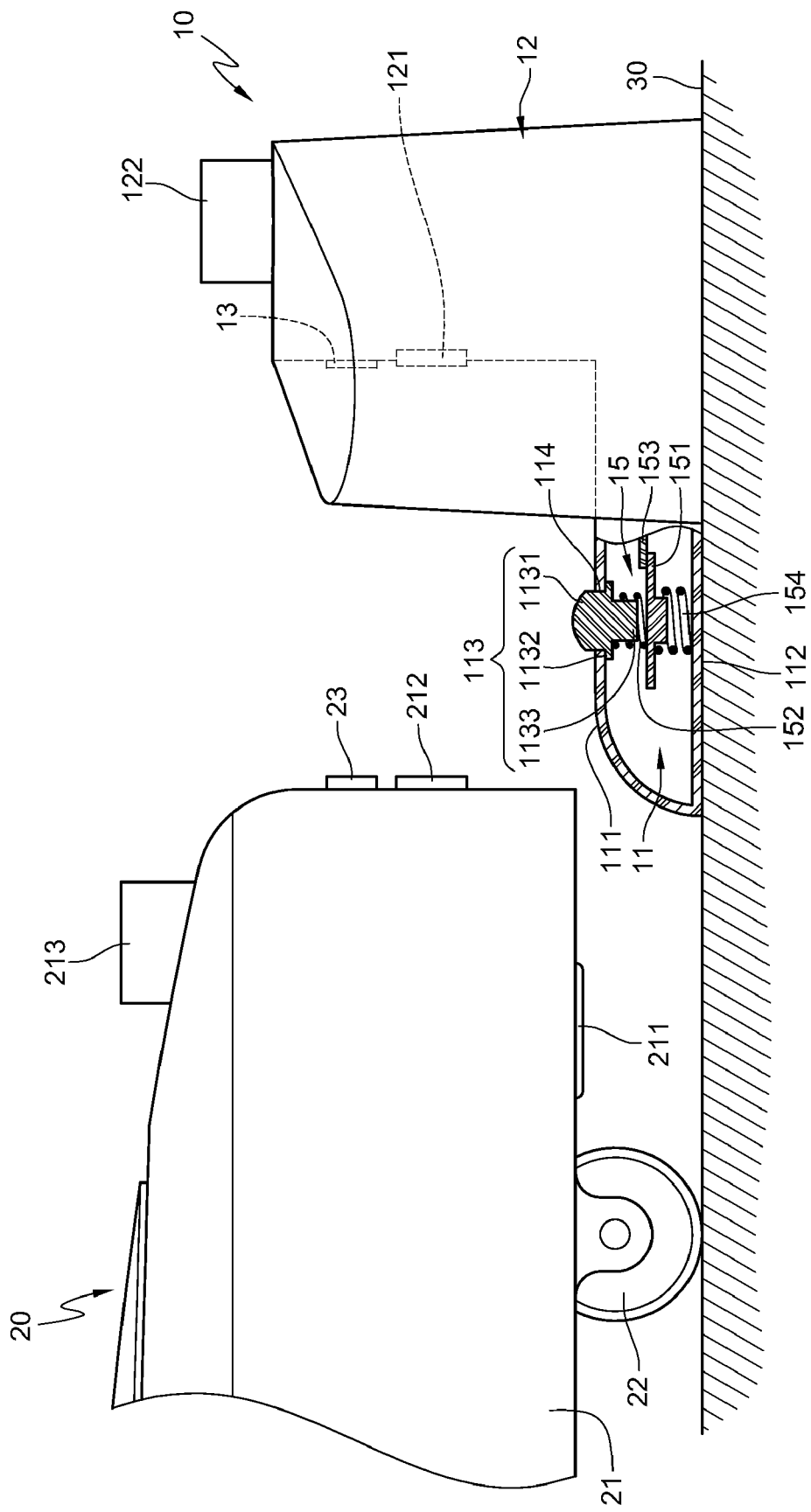
FIG. 9 is a schematic partial cross-sectional view of a charging station according to the second embodiment of the present invention.

FIGS. 8 and 9 are schematic partial cross-sectional views of a second embodiment of the present invention. The second embodiment of the present invention is substantially the same as the first embodiment in structure, and the differences between the two are described as follows.

In the electronic device of the second embodiment of the present invention, the charging station 10 further comprises a plurality of openings 114 and a conducting switch 15, and the first electrode 113 passes through each of the openings 114 with a plurality of cylindrical structures. The first electrode 113 has a contact portion 1131, a retaining portion 1132, and a conductive portion 1133. The retaining portion 1132 is annularly disposed between the contact portion 1131 and the conductive portion 1133, an outer diameter of the contact portion 1131 matches with an aperture of the openings, and an outer diameter of the retaining portion 1132 is larger than the aperture of the openings 114. Therefore, when the first electrode 113 passes through the openings 114 of the carrier 11, the contact portion 1131 of the first electrode 113 is exposed out of the surface 111 of the carrier 11, the retaining portion 1132 and the conductive portion 1133 are accommodated in the carrier 11, and the retaining portion 1132 rests on an edge of the carrier 11 adjacent to the openings 114, so as to prevent the first electrode 113 from departing from the carrier 11.

The conducting switch 15 is disposed in the carrier 11, and has a first conducting strip 151, a plurality of first springs 152, a second conducting strip 153, and a plurality of second springs 154. The conducting strip 151 is disposed below the first electrode 113. One end of the plurality of first springs 152 rests on the first conducting strip 151, and the other end is urged against the first electrode 113 and sleeved on the conductive portion 1133 of the first electrode 113, so that the first conducting strip 151 is spaced from the conductive portion 1133 of the first electrode 113 by a distance. An elastic coefficient of the plurality of second springs 154 is greater than that of the plurality of first springs 152. One end of the plurality of second springs 154 rests on an inner side surface of the bottom of the carrier, and the other end of the plurality of second springs 154 is urged against the first conducting strip 151, so that the first conducting strip 151 is located between the plurality of first springs 152 and the plurality of second springs 154. Meanwhile, the first conducting strip 151 under the influence of the plurality of second springs 154 normally contacts the second conducting strip 153, and one end of the second conducting strip is coupled to the charging control module (not shown) in the seat 12.

Therefore, the first conducting strip 151 may be normally electrically connected to the charging control module through the connection with the second conducting strip 153. Moreover, as the first electrode 113 and the first conducting strip 151 are spaced by a distance, the first electrode 113 is normally electrically disconnected.

Figure 10:
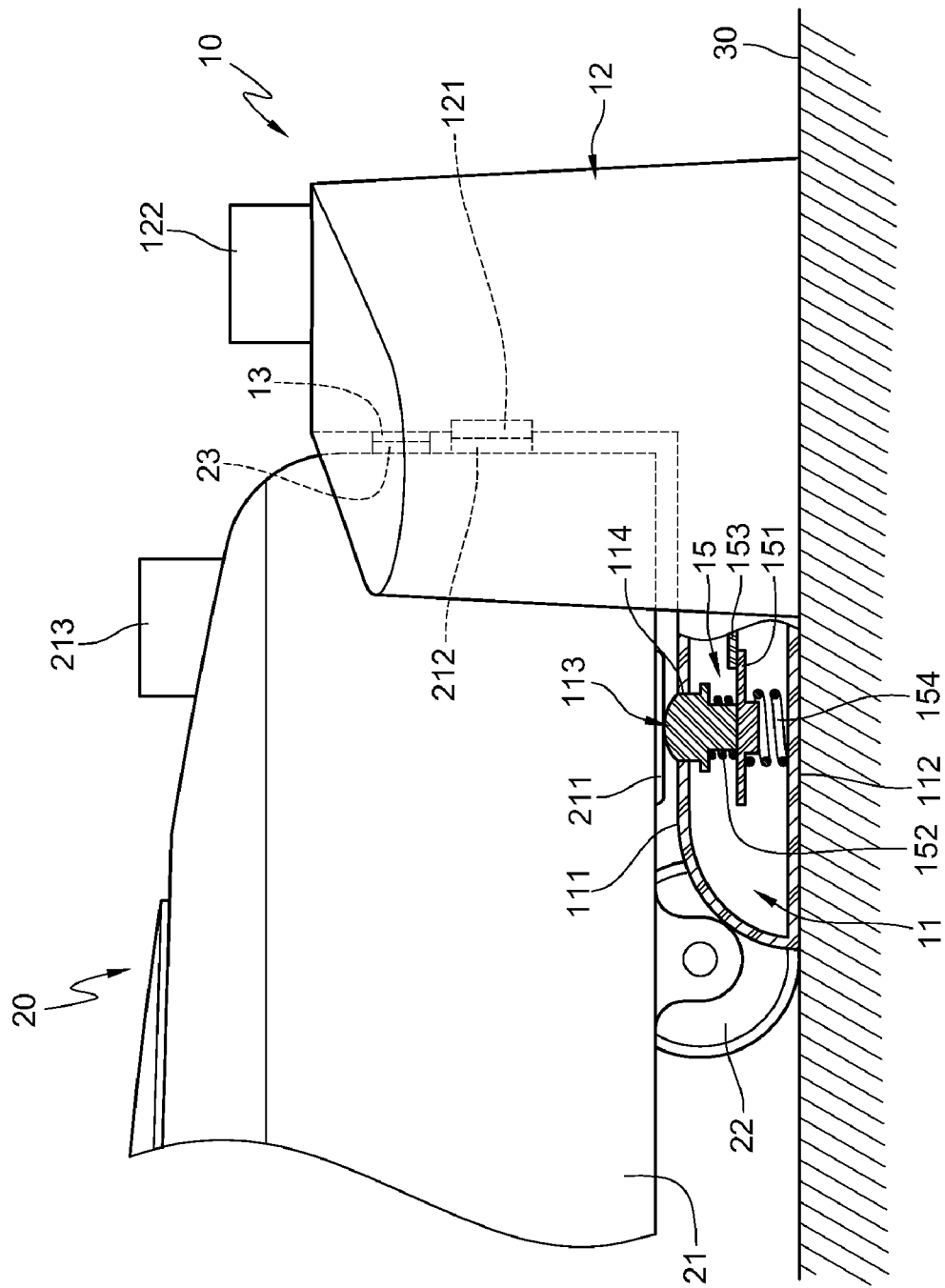
FIGS. 10 and 11 are schematic views illustrating the operation of the charging station according to the second embodiment of the present invention.

Referring to FIG. 10, when the main unit 20 is guided by the wireless signal transmitter 122 and connected to the charging station 10, the main unit 20 first contacts the first electrode 113 of the charging station 10 with the third electrode 211. In this case, as the height of the third electrode 211 above the ground surface is fixed and corresponding to the height of the contact portion 1131 of the first electrode 113 above the ground surface, when the third electrode 211 is pressed against the first electrode 113, the plurality of first springs 152 is deformed under the compression of the first electrode 113, and the conductive portion of the first electrode 113 is propelled to contact the first conducting strip 151. Thereby, the first electrode 113 is electrically conducted to the third electrode 211.

Figure 11:
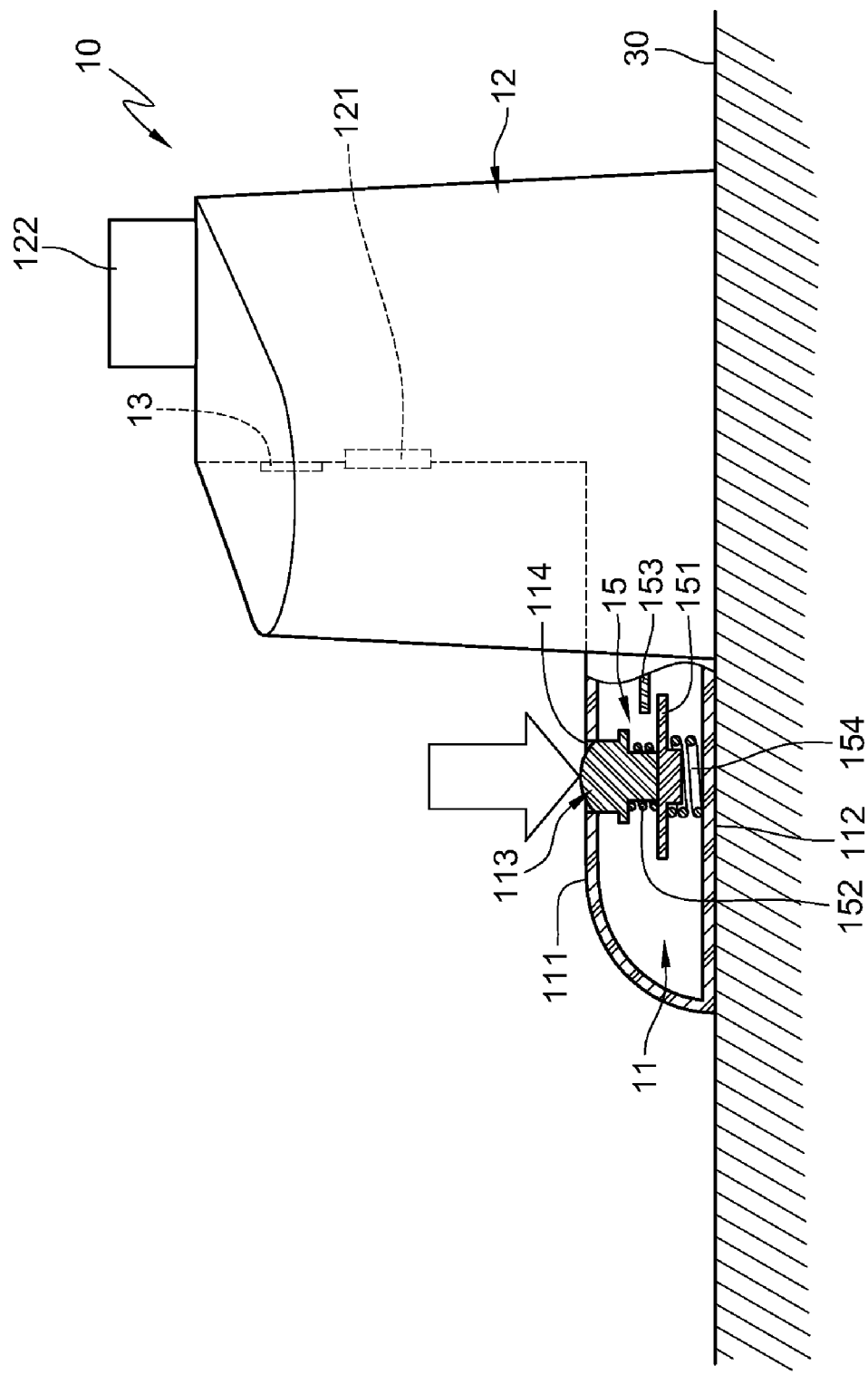

In view of the above, the conducting switch 15 is disposed to ensure that the circuit is conducted only after the charging station 10 is connected to the main unit 20, so as to prevent the user from getting injured by an electric shock or stroke when operating the charging station. That is, when the user touches the first electrode 113 of the charging station by mistake with a force insufficient to withstand the elastic force of the plurality of first springs 152, the first electrode 113 is kept in the electrically disconnected state. Moreover, referring to FIG. 11, when the user touches the first electrode 113 by mistake with an excessively large force, the plurality of second springs 154 is deformed by compression, and the first conducting strip 151 is propelled to depart from the second conducting strip 153, so that the first electrode 113 and the charging control module are not electrically connected and thus in the electrically disconnected state. Therefore, the conducting switch 15 can be disposed to further enhance the safety of the charging station 10 in use.

In the electronic device of the present invention, the positive and negative electrodes of the charging station and the main unit contacting each other are disposed on different planes, so that when the main unit is connected to the charging station, the positive electrodes (or the negative electrodes) are first electrically conducted, and then the negative electrodes (or the positive electrodes) are electrically conducted. Therefore, when the positive and negative electrodes of the main unit and the charging station contact each other, sparkles can be avoided to enhance the safety in use. In addition, as the positive and negative electrodes are located on different planes, the risk that the user touches the positive and negative electrodes at the same time by mistake to cause an electric shock is minimized.

What is claimed is:

1. An electronic device, comprising:
a charging station, having a seat, a carrier, a first electrode, and a second electrode, wherein the seat and the first electrode are disposed on the carrier, the second electrode is disposed on the seat, the first electrode and the second electrode form an angle therebetween, the carrier further comprises an opening and a conducting switch, the first electrode passes through the opening, the conducting switch is disposed in the carrier, and the conducting switch comprises:
a first conducting strip, disposed below the first electrode; and
at least one first spring, having one end resting on the first conducting strip, and the other end urged against the first electrode, wherein the first electrode exposes out of the opening through the first spring, and is normally separated from the first conducting strip; and
a main unit, detachably connected to the charging station, and having a third electrode corresponding to the first electrode and a fourth electrode corresponding to the second electrode, wherein when the main unit is to be connected to the charging station, the main unit contacts the second electrode with the fourth electrode, before contacting the first electrode with the third electrode, and the third electrode of the main unit is pressed against the first electrode and contacts the first conducting strip through the first electrode, so that the main unit is capable of being recharged by the charging station.

2. The electronic device according to claim 1, wherein the first electrode and the third electrode have the same electrode polarity, the second electrode and the fourth electrode have the same electrode polarity, and the polarity of the first electrode is opposite to the polarity of the second electrode.

3. The electronic device according to claim 1, wherein the main unit further comprises a magnet, the charging station further comprises a metal strip, and when the main unit is connected to the charging station, the magnet is attracted to the metal strip.

4. The electronic device according to claim 1, wherein the charging station further comprises a magnet, the main unit further comprises a metal strip, and when the main unit is connected to the charging station, the magnet is attracted to the metal strip.

5. The electronic device according to claim 1, wherein the conducting switch further comprises at least one second spring and a second conducting strip, one end of the second spring rests on an inner side surface of the carrier and the other end of the second spring is urged against the first conducting strip, the first conducting strip is located between the first spring and the second spring and normally contacts the second conducting strip, and the first electrode is electrically connected to the second conducting strip through the first conducting strip.

6. The electronic device according to claim 5, wherein an elastic coefficient of the second spring is larger than that of the first spring.

7. An electronic device, comprising:
a charging station, having a first electrode, a second electrode and a conducting switch, wherein the first electrode and the second electrode form an angle therebetween, and the conducting switch comprises:
a conducting strip, disposed on one side of the second electrode, and spaced from the second electrode by a predetermined distance; and
a reed, having one end connected to the second electrode, and the other end suspended above one side surface of the conducting strip; and
a main unit, detachably connected to the charging station, and having a magnet corresponding to the reed, a third electrode corresponding to the first electrode, and a fourth electrode corresponding to the second electrode, wherein when the main unit is to be connected to the charging station, the main unit contacts the second electrode with the fourth electrode before contacting the first electrode with the third electrode, the magnet guides the reed to be attached to the conducting strip, and the second electrode is electrically connected to the conducting strip through the reed, so that the main unit is capable of being recharged by the charging station.

8. The electronic device according to claim 7, wherein the first electrode and the third electrode have the same electrode polarity, the second electrode and the fourth electrode have the same electrode polarity, and the polarity of the first electrode is opposite to the polarity of the second electrode.

9. The electronic device according to claim 7, wherein the main unit further comprises a magnet, the charging station further comprises a metal strip, and when the main unit is connected to the charging station, the magnet is attracted to the metal strip.

10. The electronic device according to claim 7, wherein the charging station further comprises a magnet, the main unit further comprises a metal strip, and when the main unit is connected to the charging station, the magnet is attracted to the metal strip.

11. An electronic device, comprising:
a charging station, having a magnet, a first electrode and a second electrode, wherein the first electrode and the second electrode form an angle therebetween; and
a main unit, detachably connected to the charging station, and having a third electrode corresponding to the first electrode, a fourth electrode corresponding to the second electrode, and a conducting switch, wherein the conducting switch comprises:
a conducting strip, disposed on one side of the fourth electrode, and spaced from the fourth electrode by a distance; and
a reed, having one end connected to the fourth electrode, and the other end suspended above one side surface of the conducting strip and corresponding to the magnet;
wherein when the main unit is to be connected to the charging station, the main unit contacts the second electrode with the fourth electrode before contacting the first electrode with the third electrode, the magnet guides the reed to be attached to the conducting strip, and the fourth electrode is electrically connected to the conducting strip through the reed, so that the main unit is capable of being recharged by the charging station.

12. The electronic device according to claim 11, wherein the first electrode and the third electrode have the same electrode polarity, the second electrode and the fourth electrode have the same electrode polarity, and the polarity of the first electrode is opposite to the polarity of the second electrode.

13. The electronic device according to claim 11, wherein the main unit further comprises a magnet, the charging station further comprises a metal strip, and when the main unit is connected to the charging station the magnet is attracted to the metal strip.

14. The electronic device according to claim 11, wherein the charging station further comprises a magnet, the main unit further comprises a metal strip, and when the main unit is connected to the charging station the magnet is attracted to the metal strip.

* * * * *